United States Patent [19]

Langhals

[11] Patent Number: 5,693,808
[45] Date of Patent: Dec. 2, 1997

[54] PROCESS FOR THE PREPARATION OF PERYLENEIMIDES, NOVEL DI-, TRI- AND TETRACHROMOPHORIC PERYLENE DYES AND THEIR USE

[75] Inventor: Heinz Langhals, Ottobrunn, Germany

[73] Assignee: Ciba Specialty Chemicals Corporation, Tarrytown, N.Y.

[21] Appl. No.: 554,214

[22] Filed: Nov. 6, 1995

[30] Foreign Application Priority Data

Nov. 10, 1994 [CH] Switzerland .................. 3376/94

[51] Int. Cl.$^6$ .................................. C07D 471/04
[52] U.S. Cl. ............ 546/37; 544/198; 544/209; 544/322; 544/323
[58] Field of Search .................. 544/198, 209, 544/322, 323; 546/37

[56] References Cited

U.S. PATENT DOCUMENTS

4,968,571  11/1990  Gruenbaum et al. .......... 430/58

FOREIGN PATENT DOCUMENTS

| 0443566 | 8/1991 | European Pat. Off. . |
| 3814647 | 10/1989 | Germany .................. 546/37 |
| 4018830 | 12/1991 | Germany . |
| 1370433 | 10/1974 | United Kingdom . |

OTHER PUBLICATIONS

Derwent Abstract 92-000408/01 of DE 4,018,830, 1991.
Chemical Abstract 116:237369 of DE 4,018,830, 1991.
Monatshefte Für Chemie, vol. 104, pp. 848–853 (1973).
Chem. Ber., vol. 124, pp. 529–535 (1991).

*Primary Examiner*—Yogendra N. Gupta
*Attorney, Agent, or Firm*—Michele A. Kovaleski; Kevin T. Mansfield

[57] ABSTRACT

Di-, tri- and tetrachromophoric perylene-3,4:9,10-tetracarboxylic acid imides of the formula I

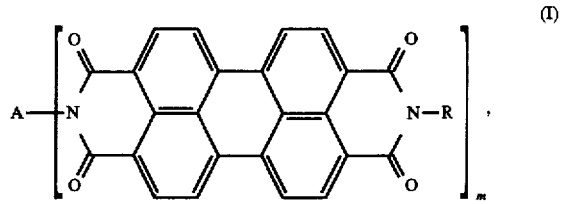

in which
A is, for example, 1,4-phenylene,
R is 1-hexylheptyl and
m is 2, are readily accessible by reaction of a perylene-3,4:9,10-tetracarboxylic acid monoanhydride monoimide with 1,4-diaminobenzene-bisformamide. The preparation process and also a specific process for the preparation of monochromic perylene-3,4:9, 10-tetracarboxylic acid bisimides are also claimed. These processes are particularly suitable for reaction of highly electron-rich aromatic amines, which cannot be reacted under conventional condensation conditions. The compounds according to the invention are suitable, for example, as colouring agents for melt coloration of high molecular weight organic material, for use in security printing, as fluorescence dyes for machine-readable markings, as laser dyes and for the production of printing toners, colour filters, organic photoreceptors, electroluminescence and photoluminescence elements or solar collectors.

8 Claims, No Drawings

PROCESS FOR THE PREPARATION OF PERYLENEIMIDES, NOVEL DI-, TRI- AND TETRACHROMOPHORIC PERYLENE DYES AND THEIR USE

The invention relates to novel di-, tri- and tetrachromophoric perylene dyes, a process for their preparation by reaction of perylene-3,4:9,10-tetracarboxylic acid 3,4-anhydride-9,10-imides with formamides of the corresponding primary, di-, tri- or tetraamines, and their use, and to a specific process for the preparation of perylene-3,4:9,10-tetracarboxylic acid bisimides by reaction of perylene-3,4:9,10-tetracarboxylic acid bisanhydrides or of perylene-3,4:9,10-tetracarboxylic acid anhydride-imides with formamides of primary amines.

Perylene dyes, or perylene-3,4:9,10-tetracarboxylic acid bisimides, are usually prepared from perylene-3,4:9,10-tetracarboxylic acid bisanhydride, which is readily accessible in industry, or perylene-3,4:9,10-tetracarboxylic acid 3,4-anhydride-9,10-imides and from primary aliphatic or aromatic amines.

While reaction with usual primary amines takes place smoothly under the customary reaction conditions, reaction with particularly electron-rich amines, in particular with electron-rich aromatic amines, for example 1,3,5-triaminobenzene, takes place to give products other than those expected. Smooth reaction of these amines with perylene peri-anhydride units is an unsolved synthesis problem. Furthermore, the electron-rich aromatic or heteroaromatic amines are in general very sensitive to oxidation, especially in the presence of bases, which makes their handling considerably more difficult. Examples are amines which carry one or more amino groups, alkoxy groups or phenoxy groups and/or are derived from electron-rich heteroaromatics such as pyrrole or furan. A way of reducing the sensitivity of these amines to oxidation, especially in the presence of bases, for example by derivatization, would therefore be considerable progress for the synthesis of the perylene dyes.

Thus, if instead of the primary amines the formamides of the amines in question are employed for the condensation of perylene-3,4:9,10-tetracarboxylic acid bisanhydride or monoanhydride-monoimides, a smooth reaction to give the bisimides is astonishingly found under the customary reaction conditions. The formamides react under these conditions with evolution of $CO_2$ (after oxidation) to give the same products as if the corresponding free amines were employed for the reaction.

Although the reaction of carboxylic acid anhydrides, for example phthalic anhydride, naphthalenedicarboxylic anhydride, trimellitic acid anhydride or pyrromellitic acid dianhydride, with formamide or with N-methylformamide is known in general (cf., for example, H. Schindlbauer, Monatshefte für Chemie 104. 848 (1973)], this reaction has so far being described only once, in GB-B 1,370,433, for the preparation of a particular perylenetetracarboxylic acid bisimide.

In the case of the reaction, according to the invention, of the formamides, these are not, as could initially be assumed and as is described in the abovementioned GB-B 1,370,433 for the synthesis of N,N'-dimethylperylene-3,4:9,10-tetracarboxylic acid bisimide in aqueous solutions, hydrolysed to give the free amines, which could then react in the customary manner. Rather, a novel type of reaction exists here—the formamide group intervenes actively in the reaction event. Evidence of this is the increased reactivity of the formamides compared with the amines, and also the generally improved yield of the reaction with the formamides. Aromatic formamides can thus be reacted smoothly, even if the corresponding amines do not react or react only very slowly.

The use of formamides instead of the amines in question has considerable advantages in certain cases. Formamides are thus in general completely stable to storage, compared with the free amines, while with the latter oxidation is a considerable problem in many cases (cf., for example, the known brown coloration during storage of aniline if complete absence of oxygen is not ensured). A quite substantial advance is achieved, however, if the primary amine is very electron-rich. Thus, reaction of 1,3,5-triaminobenzene with N-(1-hexylheptyl)perylene-3,4:9,10-tetracarboxylic acid 3,4-anhydride-9,10-imide presents considerable problems because of the sensitivity of the amine to oxidation. On the other hand, if the condensation is carried out with the tris-formamide of 1,3,5-triaminobenzene, all three amino groups react smoothly, and the corresponding trichromophoric dye is obtained, which is the first perylene dye with a Y-shaped arrangement of the chromophores.

The trichromophoric perylene dye has the customary absorption and fluorescence spectrum, but has a rapid intramolecular energy transfer—which has consequences in respect of the fluorescence depolarization, so that dyes of this type can be detected or determined analytically without analytical problems alongside monofluorophoric perylene dyes via the linear dichroism.

In contrast, for example, if the free triaminopyridine which has not been derivatized with formamide is employed for the reaction with N-(1-hexylheptyl)perylene-3,4:9,10-tetracarboxylic acid 3,4-anhydride-9,10-imide only the dichromophoric and not the trichromophoric perylene dye is obtained.

Di- or tri- and tetrachromophoric perylene dyes have hitherto been scarcely described or have not been described at all. Only two representatives of the dichromophoric dyes belong to the prior art, and both have been prepared in a conventional manner by reaction of a perylene-3,4:9,10-tetracarboxylic acid 3,4-anhydride-9,10-imide with the free primary diamine.

H. Kaiser, J. Lindner and H. Langhals in Chem. Ber. 124, 529 (1991) describe the synthesis of non-symmetrically substituted perylene fluorescence dyes. The preparation of the dichromophoric product of the reaction of 1,4-diaminobutane with N-(2,5-di-tert-butylphenyl)-perylene-3,4:9,10-tetracarboxylic acid monoanhydride-monoimide is also described here.

U.S. Pat. No. 4,968,571 and EP-A 443,566 describe the use of photoconductive perylene derivatives in electrophotographic recording materials. The dichromophoric product of the reaction of 1,4-phenylenediamine with N-phenethyl-perylene-3,4:9,10-tetracarboxylic acid monoanhydride-monoimide is also mentioned here.

The present Application relates to perylene-3,4:9,10-tetracarboxylic acid imides of the formula I

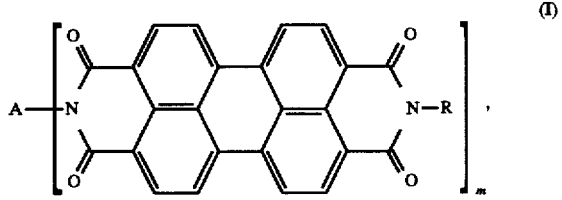

in which

A is a di-, tri- or tetravalent carbocyclic or heterocyclic aromatic radical,

R is H, an alkyl, aralkyl or cycloalkyl group or a carbocyclic or heterocyclic aromatic radical
and
m is 2, 3 or 4,
with the proviso that if m is 2 and R is phenethyl, A is not 1,4-phenylene.

The compounds according to the invention can be prepared by reaction of a perylene-3,4:9,10-tetracarboxylic acid monoanhydride-monoimide of the formula III

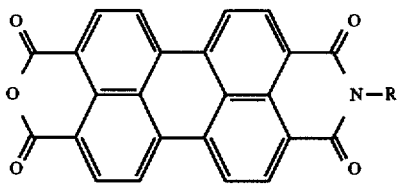

with a formamide of the formula IV

(IV)

in which
A, R and m are as defined above.

The present invention also relates to this preparation process. The reaction is preferably carried out at a temperature of 150°–250° C. and in the presence of a nitrogen-containing heterocyclic compound, a carboxylic acid or a glycol.

Perylene-3,4:9,10-tetracarboxylic acid monoanhydride-monoimides of the formula III are known or can be prepared by known methods. Some of these compounds are described, for example, in the abovementioned article in Chem. Ber. 124, 529 (1991).

The di-, tri- or tetravalent carbocyclic or heterocyclic aromatic radicals A are derived from primary di-, tri- or tetra-amines. Suitable carbocyclic amines are, for example, mono- to tetracyclic, in particular mono- or bicyclic amines, preferably derived from benzene, preferably substituted in the 1,4-, 1,3,5- or 1,2,4,5-positions; from biphenyl, preferably substituted in the 4,4'-positions, or from naphthalene, preferably substituted in the 2,7-positions. Suitable heterocyclic aromatic amines can be purely heterocyclic or contain a heterocyclic ring and one or more fused-on benzene rings. Examples of heterocyclic ring systems are pyridine, preferably substituted in the 2,4- or 2,4,6-positions; and pyrimidine and s-triazine, in each case preferably substituted in the 2,4,6-positions.

Preferred radicals A are derived from benzene, biphenyl, naphthalene, anthracene, phenanthrene, pyridine, pyridazine, pyrimidine, pyrazine or triazine, in particular radicals of the formula

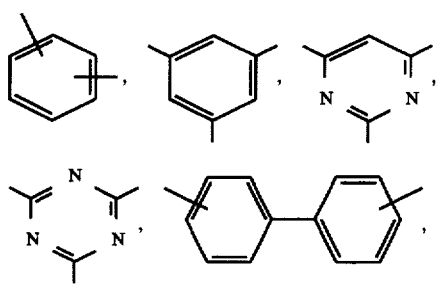

-continued

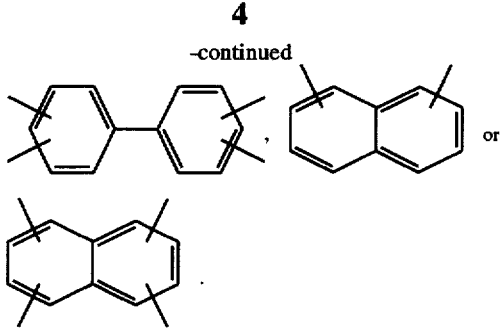

Perylene-3,4:9,10-tetracarboxylic acid imides of the formula I according to the invention which are furthermore preferred are those in which R is a secondary $C_7$–$C_{41}$ alkyl radical or a radical of the formula II

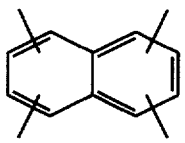

in which
$R_1$ is a branched $C_3$–$C_8$-alkyl radical and
n is 0, 1, 2 or 3.

Further preferred compounds are those in which
R is —$CH(R_2)_2$ and
$R_2$ is $C_4$–$C_{18}$-alkyl, preferably $C_6$–$C_{10}$-alkyl,
or in which
R is a radical of the formula II defined above,
in which
$R_1$ is tert-butyl.

Especially preferred compounds of the formula I are those in which
R is 2,5-di-tert-butylphenyl or —$CH(R_2)_2$ and
$R_2$ is a straight-chain radical, preferably n-hexyl, n-heptyl, n-octyl, n-nonyl or n-decyl.

The compounds described in the preparation examples are also especially preferred.

The invention furthermore relates to a process for the preparation of perylene-3,4:9,10-tetracarboxylic acid bisimides of the formula V

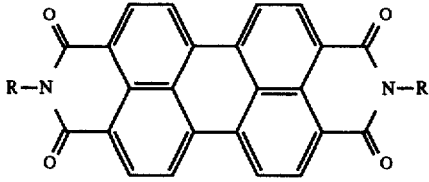

by reaction of perylene-3,4:9,10-tetracarboxylic acid bisanhydride or of perylene-3,4:9,10-tetracarboxylic acid monoanhydride-monoimides of the formula III

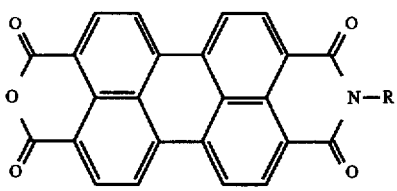

with a formamide of the formula VI, RNHCHO (VI),
in which
the radicals R independently of one another are H, an alkyl, aralkyl or cycloalkyl group or a carbocyclic or heterocyclic aromatic radical, which comprises carrying out the reaction at a temperature of 150°–250° C. and in the presence of a nitrogen-containing heterocyclic compound, a carboxylic acid or a glycol.

Preferred radicals R are the preferred radicals defined above for the compounds of the formula I.

Both the process for the preparation of compounds of the formula I and the process mentioned last for the preparation of bisimides of the formula V are preferably carried out in the presence of a nitrogen-containing heterocyclic compound chosen from the group consisting of pyridine, picoline, lutidine and, in particular, imidazole or quinoline. If the preparation procedes in a carboxylic acid, this is preferably acetic acid, while the preferred glycol is ethylene glycol.

The reaction can be carried out without further components in the reaction mixture, or suitably in the presence of a zinc, lead, calcium or magnesium salt as a catalyst. Preferred catalysts are lead acetate, zinc chloride or, in particular, zinc acetate.

Not only the rate of reaction of the conversion but also the yields are increased by addition of the abovementioned metal salts or catalysts. Optimum yields of symmetrically or non-symmetrically substituted perylene dyes are achieved over reaction times of 8–10 hours at a temperature of about 180° C. with the addition of zinc acetate.

The compounds of the formula I according to the invention are preferably not substituted in the perylene ring system. However, they can also contain one or more, but as a rule not more than six, substituents in the ring system, where the substituents can be, independently of one another, alkyl, aralkyl, cycloalkyl, alkoxy, aryloxy, alkylaryl, alkylmercapto, arylmercapto, a carbocyclic or heterocyclic aromatic radical or chloro, bromo, nitro, —$SO_3H$ (and metal salts thereof or ammonium salts thereof) or —$SO_3R$ (where R is alkyl or aryl), amino, acylaminomethyl, for example acetylaminomethyl, alkylamino, arylamino, phthalimidomethyl, aminomethyl, dimethylaminomethyl (prepared, for example, by cleavage of the corresponding phthalimido derivative) or pyrazolomethyl.

The sulfo- or amino-substituted perylene derivatives mentioned last are particularly suitable as rheology-improving agents. Corresponding derivatives of other pigment systems, for example of phthalocyanine pigments or of quinacridone pigments, and preparation thereof are known, for example, from U.S. Pat. No. 4,981,888, EP-A 356,390, EP-A 508,704, U.S. Pat. No. 5,212,221 or EP-A 485,337. The present substituted perylene derivatives can be prepared in an analogous manner.

The substituent or the substituents are preferably in the 1-, or 1,6-, 2,5-, 7,12-, or 8,11-position. The substituted perylene derivatives preferably have one or two substituents in the ring system, and in the case of disubstituted compounds, the substituents are preferably identical.

The substituted perylene derivatives can be prepared from the corresponding unsubstituted compounds by generally known methods.

Because of their properties, the compounds according to the invention are suitable for a large number of uses.

They can thus be employed, for example, as pigments for melt coloration of plastics or paints. The invention therefore furthermore relates to melt-coloured high molecular weight organic material comprising a compound of the formula I, and to a process for melt coloration of high molecular weight organic material using these compounds.

Suitable plastics are, for example, polyolefins, polyvinylchloride, fluorine polymers, for example polyfluoroethylene, polytrifluorochloroethylene or tetrafluoroethylene/hexafluoroprophene copolymer, and silicone resins, but in particular engineering plastics, for example polycarbonates, polyacrylates, polymethacrylates, polystyrene, ABS, polyesters, in particular polyalkyleneterephthalates, such as polybutyleneterephthalate (PBT) or polyethyleneterephthalate (PET), polyamides, polyether-ketones or polyurethanes, individually or as mixtures. The compounds according to the invention are advantageously employed in a concentration of 0.01 to 10, preferably 0.01–5% by weight, based on the polymer.

Examples of polyolefins which can be dyed with the compounds according to the invention are high and low density polyethylene (HD-PE, LD-PE and LLD-PE), polyisobutylene and, in particular, polypropylene, as well as copolymers of polyolefins with, for example, polyethers, polyether-ketones or polyurethanes. Polypropylene is preferred.

Dyeing is carried out by the customary processes, for example by mixing a compound according to the invention or a mixture of such compounds with the granules or powder of the plastic without it having first to be incorporated into a preparation, and extruding the mixture to fibers, films or granules. The latter can then be shaped to objects, for example by the injection moulding process.

The red fluorescent dyeings obtained have a high purity and high saturation and are distinguished by good transparency and by good stability, especially towards light.

The invention furthermore relates to the use of the compounds according to the invention in security printing, as fluorescence dyes for machine-readable markings, as laser dyes, and for the production of printing toners ("non-impact printing toners"), colour filters, organic photoreceptors, electroluminescence and photoluminescence elements or solar collectors.

Compounds according to the invention which contain one or more substituents chosen from the group consisting of —$SO_3H$ (and metal salts thereof or ammonium salts thereof) or —$SO_3R$ (where R is alkyl or aryl), amino, acylaminomethyl, for example acetylaminomethyl, alkylamino, arylamino, phthalimidomethyl, aminomethyl, dimethylaminomethyl (prepared, for example, by cleavage of the corresponding phthalimido derivative) or pyrazolomethyl can furthermore be employed as rheology-improving agents.

The following examples illustrate the invention.

EXAMPLE 1

Synthesis of a bichromophoric perylene dye by reaction of 2,4,6,-triaminopyrimidine with N-(1-hexylheptyl)-perylene-3,4:9,10-tetracarboxylic acid 3,4-anhydride-9,10-carboximide 3.70 g (6.45 mmol) of N-(1-hexylheptyl)-perylene-3,4:9, 10-tetracarboxylic acid 3,4-anhydride-9,10-carboximide (prepared according to H. Kaiser, J. Lindner, H. Langhals, Chem. Ber. 1991, 124, 529) are reacted in 10 g of imidazole with the addition of 200 mg (0.90 mmol) of zinc acetate and 270 mg (2.16 mmol) of 2,4,6-triaminopyrimidine at 200° C. under argon as an inert gas for 3 hours. The viscous reaction product is taken up in 500 ml of ethanol, 100 ml of concentrated HCl are added and the mixture is stirred for 8 hours.

After filtration with suction over a D-4 frit, the dye is washed neutral with distilled water and dried (3.2 g). It is chromatographed over silica gel with $CHCl_3$/glacial acetic acid 10:1 as the mobile phase, a small amount of first runnings being discarded. The product, which has a reddish fluorescence, is so firmly adsorbed in the first third of the column by this procedure that elution is impossible even after increasing the glacial acetic acid concentration in the solvent. After removal of the mobile phase and drying of the column packing, the intensely violet-coloured silica gel of the first third of the column is boiled under reflux with a mixture of chloroform and 30% glacial acetic acid for 30 minutes, while stirring, during which the dye dissolves. The mixture is now filtered off with suction over a D-4 frit and the silica gel which remains is washed with chloroform/ glacial acetic acid (10:3). The intensely red-violet dye solution is concentrated on a rotary evaporator and the dye which precipitates is filtered off with suction, after addition of distilled water, and washed neutral and dried at 100° C. for 8 hours. Yield 2.3 g (86%) of crude product. No product which is pure according to elemental analysis can be obtained from the resulting crude product by renewed chromatography over silica gel with $CHCl_3$ with addition of 10% of glacial acetic acid or 10% of ethanol (column 80×4 cm), even after several chromatography passes. Yield 1.2 g (45%). UV ($CHCl_3$): $\lambda_{max}(\epsilon)$=568 nm (188422), 529 (154867), 492 (90339), 460 (33552). Fluorescence ($CHCl_3$): $\lambda_{max}$=532 nm, 575, 620. MS (70 eV): m/z(%)=1234 (0.1), 1052 (0.2), 871 (2), 870 (1), 497 (1), 435 (0.9), 412 (1), 389 (2), 183 (4), 182 (33), 154 (2), 112 (7), 111 (16), 98 (15), 97 (39), 85 (9), 84 (31), 83 (59), 82 (13), 70 (65), 69 (100), 55 (89), 43 (40), 28 (9), 27 (13). —MS (FAB/3-NBA/Xe 8KV,10W): m/z=1254 [$M^+$+$H_2O$], 1237 [$M^+$], 681, 596 (100), 520, 499, 414, 373, 345, 300, 275, 262, 250, 154, 136, 107. Since the product is not analytically pure, 100 mg of the product mixture are chromatographed over basic $Al_2O_3$ (Activity I) with $CHCl_3$/n- butanol 40:1 (column 30×1 cm). 1 st fraction: Yield 0.64 g (64%, based on the amount employed). MS (FAB/$CHCl_3$m-NBA): m/z (%)=1254 (20), 1237 (100), 1236 (45), 596 (26), 414 (100), 358 (30), 275 (18), 237 (8).

$C_{78}H_{73}N_7O_8H_2O$ (1254.4) Calculated C 74.76 H 6.03 N 7.81 Found C 74.93 H 6.28 N 7.76

EXAMPLE 2

Synthesis of a trichromophoric perylene dye by reaction of 1,3,5-Triaminobenzene-trisformamide with N-(1-hexylheptyl)-3,4:9,10-perylenetetracarboxylic acid 3,4-anhydride-9,10-carboximide (1) 1,3,5-Triaminobenzene is prepared in accordance with the instructions in Chem. Abstr. 1954, 49,9036a by reduction of 1,3,5-trinitrobenzene with powdered iron in hydrochloric acid. After treatment with 2 N HCl, 14.6 g (37%) of yellowish needles are obtained—melting point 300° C. (hydrochloride).

(2) 1,3,5-Triaminobenzene-trisformamide 1.0 g (4.3 mmol) of 1,3,5-triaminobenzene hydrochloride is introduced into 20 ml of concentrated formic acid and the solution is heated at the boiling point for 30 minutes. The cooled solution is added dropwise to 250 ml of distilled water and the product which precipitates is filtered off with suction over a D-4 frit, washed neutral with distilled water and dried in vacuo at 50° C. for 2 hours.

Yield: 550 mg (62%) of grey powder—melting point 265° C.

$C_9H_9N_3O_3$(207.2) Calculated C 52.17 H 4.38 N 20.23 Found C 51.14 H 4.43 N 20.04

(3) Synthesis of the trichromophoric perylene dye 3.0 g (5.2 mmol) of N-(1- hexylheptyl)-3,4:9,10-perylenetetracarboxylic acid -3,4-anhydride-9,10-carboximide (prepared in accordance with H. Kaiser, J. Lindner, H. Langhals, Chem. Ber. 1991, 124, 529) are reacted in 12 g of imidazole with 359 mg (1.73 mmol) of 1,3,5-triaminobenzene-trisformamide at 180° C. under argon as an inert gas for 5 hours. After cooling, the reaction mixture is taken up in 1 l of ethanol, 100 ml of concentrated HCl are added and the mixture is stirred for 2 hours. The dye crude product which precipitates is separated off by filtration with suction over a D-4 frit, washed neutral with distilled water and dried at 100° C. for 2 hours. Yield 2.8 g (crude product). For purification, the crude product is taken up in 30 ml of $CHCl_3$/n-butanol 10:1 and chromatographed over $Al_2O_3$ (activity 1) with $CHCl_3$/n-butanol 10:1. First runnings with yellow-green fluorescence are discarded and the second fraction, which has a red fluorescence, is separated off. A number of impurities remain firmly adsorbed on the first third of the column. The dye fraction, which is uniform according to thin layer chromatography, is filtered off with suction over a D-5 frit and evaporated on a rotary evaporator. The dye which precipitates is washed with distilled water and dried at 50° C. in vacuo for 5 hours. Yield 800 mg (26%)—melting point 285°–300° C. (decomposition) —$R_f$ (silica gel/$CHCl_3$/glacial acetic acid 10:1 )=0.85 -$R_f$ ($Al_2O_3$/$CHCl_3$/n-BuOH 40:1) 0.52. UV ($CHCl_3$): $\lambda_{max}(\epsilon)$=433 nm (17136), 461 (53243), 492.5 (155141), 530 (298654). Fluorescence ($CHCl_3$):

$\lambda_{max}$=538 nm, 578.

$C_{117}H_{108}N_6O_{12}H_2O$ (1808.1 ) Calculated C 77.72 H 6.13 N 4.64 Found C 77.99 H 6.27 N 4.84

The relatively stable dye hydrate can be dehydrated by drying at 100° C. under a high vacuum for 8 hours.

$C_{117}H_{108}N_6O_{12}$ (1790.1 ) Calculated C 78.49 H 6.08 N 4.69 Found C 78.25 H 6.08 N 4.84

The synthesis is repeated with the same batch, 200 mg of zinc acetate being added. The reaction time is increased to 8 hours and 25 g of imidazole are used as the solvent. The same working up gives a product which has identical IR—, $^1$H—NMR—and $^{13}$C—NMR spectra but of which the elemental analysis values deviate to a greater degree. The extinction coefficients of the product are 18% lower, which indicates a lower purity.

EXAMPLE 3

N,N'-(1-Hexylheptyl)-3,4:9,10-perylene-bis(dicarboximide)

(1) N-Hexylheptyl-formamide 20.0 g (100 mmol) of 1-hexylheptylamine are heated under reflux with 20.0 g (400 mmol) of 92 percent formic acid for 1 hour. The excess formic acid is distilled off over a 10 cm Vigreux column and the reaction product which remains is subjected to fractional distillation in vacuo. Yield 18.1 g (79%)—boiling point 165° C. (1 mm Hg)–$n_D$20=1.4577. The reaction product contains a small content of bisformamide which can be removed by distillation only with difficulty but does not interfere in the further reactions.

$C_{14}H_{29}NO$ (227.4) Calculated C 73.75 H 12.86 N 6.16 Found C 71.29 H 12.43 N 5.94

(2) Synthesis of N,N'-(1-hexylheptyl)-3,4:9,10-perylene-bis (dicarboximide) using the formamide 3.0 g (7.6 mmol) of perylene-3,4:9,10-tetracarboxylic acid bisanhydride are stirred in 20 g of imidazole with 200 mg (0.90 mmol) of zinc acetate and 2.60 g (114 mmol) of the formamide of 1-hexylheptylamine at 180° C. under argon as an inert gas for 8 hours. Yield 3.8 g (66%), chromatographed over silica gel with CHCl₃ (column 80×4 cm). Melting point 157° C.—$R_f$(silica gel/CHCl₃)=0.75. UV (CHCl₃):$\lambda_{max\ (\epsilon)}$=460 nm (18239), 492 (52285), 528 (87547). Fluorescence (CHCl₃):$\lambda_{max}$=538 nm, 573. MS (70eV): m/z (%)=756 (13), 755 (47), 754 (88) [M⁺], 737 (8), 669 (4), 575 (3), 574 (16), 573 (43), 572 (49), 555 (5), 404 (4), 403 (7), 392 (26), 391 (75), 390 (100), 374 (5), 373 (14), 345 (9), 69 (7), 55 (10), 43 (4), 41 (5), 29 (1).

EXAMPLE 4

N,N'-Di-phenyl-3,4:9,10-perylene-bis(dicarboximide)

2.0 g (5.1 mmol) of perylene-3,4:9, 10-tetracarboxylic acid bisanhydride are reacted in 8 g of imidazole with 100 mg (0.45 mmol) of zinc acetate and 1.85 g (13.68 mmol) of formanilide under argon as an inert gas at 180° C., while stirring, for 4 hours. Yield 2.0 g (72%), recrystallized extractively from methanol.

EXAMPLE 5

N-(1-Hexylheptyl)-N'-phenyl)-3,4:9,10-perylene-bis (dicarboximide)

2.00 g (3.48 mmol) of N-(1-hexylheptyl)-3,4:9,10-perylenetetracarboxylic acid 3,4-anhydride-9,10-carboximide are reacted with 847 mg (6.26 mmol) of formanilide and 100 mg (0.45 mmol) of zinc acetate in 10 g of imidazole at 180° C. under argon as an inert gas for 10 hours. The crude product is worked up in accordance with the general instructions. Yield 2.15 g (95%). For purification, the dye is chromatographed over silica gel with CHCl₃ as the mobile phase (column 80×4 cm). The dye fraction is evaporated on a rotary evaporator and the dye which precipitates is washed with water and dried at 50° C. in vacuo for 4 hours. Yield 1.40 g (62%)—$R_f$(CHCl₃)=0.53.—UV (CHCl₃) :$\lambda_{max}(\epsilon)$=492 nm (18750), 492(52272), 528(86727). Fluorescence (CHCl₃): $\lambda_{max}$=538 nm, 578.

C₄₃H₄₀N₂O₄ (648.8) Calculated C 79.60 H 6.21 N 4.31 Found C 79.61 H 6.28 N 4.49

EXAMPLE 6

Synthesis of a trichromophoric perylene dye by reaction of 1,3,5-triaminobenzene-trisformamide with N-(1-heptyloctyl)-3,4:9,10-perylenetetracarboxylic acid 3,4-anhydride-9,10-carboximide 1.5 g (2.49 mmol) of N-(1-heptyloctyl)-3,4:9,10-perylenetetracarboxylic acid 3,4-anhydride-9,10-carboximide (prepared in accordance with H. Kaiser, J. Lindner, H. Langhals, Chem. Ber. 1991, 124, 529) are reacted in 6 g of imidazole with 172 mg (0.83 mmol) of 1,3,5-triaminobenzene-trisformamide under argon as an inert gas at 185° C. for 5 hours. After cooling, the reaction mixture is taken up in 0.5 l of ethanol, 50 ml of concentrated HCl are added and the mixture is stirred for 2 hours. The dye crude product which precipitates is separated off by filtration with suction over a D-4 frit, washed neutral with distilled water and dried at 120° C. for 2 hours. Yield 1.4 g (crude product). For purification, the crude product is taken up in 15 ml of CHCl₃/n-butanol 10:1 and chromatographed over Al₂O₃ (activity 1) with CHCl₃/n-butanol 10:1. First runnings with a yellow-green fluorescence are discarded and the second fraction, which has a red fluorescence, is separated off. This product is purified several more times by chromatography (CHCl₃/glacial acetic acid 20:1 on silica gel; CHCl₃/ethanol 10:1 on silica gel; once more CHCl₃/glacial acetic acid 20:1 on silica gel), until a dye fraction which is uniform according to thin layer chromatography is obtained. This is filtered off with suction over a D-5 frit and evaporated on a rotary evaporator. The dye which precipitates is washed with distilled water and dried at 115° C. in vacuo for 14 hours. Yield 200 mg (13%)—melting point 280° C. (decomposition)—$R_f$(silica gel/CHCl₃/ ethanol 10:1 )=0.58. UV (CHCl₃): $\lambda_{max}(\epsilon)$=437 nm (13499), 460 (48343), 492 (148632), 530 (294607).

Fluorescence (CHCl₃): $\lambda_{max}$=535 nm, 575.

C₁₂₃H₁₂₀N₆O₁₂ (1874.3) Calculated C 78.82 H 6.45 N 4.48 Found C 79.10 H 6.74 N 4.72

EXAMPLE 7

Synthesis of a trichromophoric perylene dye by reaction of 1,3,5-triaminobenzene-trisformamide with N-(1-nonyldecyl)-3,4:9,10-perylenetetracarboxylic acid 3,4-anhydride-9,10-carboximide The procedure is analogous to Example 6, but instead of N-(1-heptyloctyl)-3,4:9,10-perylenetetracarboxylic acid 3,4-anhydride-9,10-carboximide, the corresponding N-(1-nonyldecyl) derivative is used. N-(1-nonyldecyl)-3,4:9,10-perylenetetracarboxylic acid 3,4-anhydride-9,10-carboximide is obtained by reaction with 1,3,5-triaminobenzene-trisformamide.

What is claimed is:

1. A perylene-3,4:9,10-tetracarboxylic acid imide of the formula I

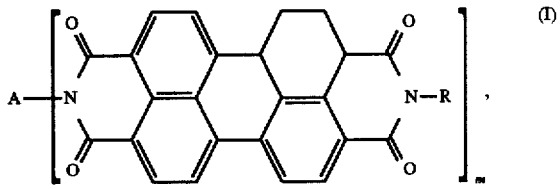

in which

A is a di-, tri- or tetravalent carbocyclic or heterocyclic aromatic radical,

R is H, an alkyl, aralkyl or cycloalkyl group or a carbocyclic or heterocyclic aromatic radical and m is 2, 3 or 4, with the proviso that if m is 2 and R is phenethyl, A is not 1,4-phenylene.

2. A perylene-3,4:9,10-tetracarboxylic acid imide according to claim 1, in which R is a secondary C₇–C₄₁ alkyl radical or a radical of the formula II

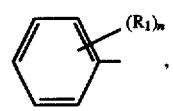

in which

R₁ is a branched C₃–C₈-alkyl radical and n is 0, 1, 2 or 3.

3. A perylene-3,4:9,10-tetracarboxylic acid imide according to claim 2, in which R is —CH(R₂)₂ and R₂ is C₄–C₁₈- alkyl, or in which
R is a radical of the formula II
in which
$R_1$ is tert-butyl.

4. A perylene-3,4:9,10-tetracarboxylic acid imide according to claim 3, in which
$R_2$ is $C_6$–$C_{10}$-alkyl.

5. A perylene-3,4:9,10-tetracarboxylic acid imide according to claim 1, in which
R is 2,5-di-tert-butylphenyl or —CH($R_2$)$_2$ and
$R_2$ is a straight-chain radical.

6. A perylene-3,4:9,10-tetracarboxylic acid imide according to claim 5, in which
$R_2$ is n-hexyl, n-heptyl, n-octyl, n-nonyl or n-decyl.

7. A perylene-3,4:9,10-tetracarboxylic acid imide according to claim 1, in which
A is a radical derived from benzene, biphenyl, naphthalene, anthracene, phenanthrene, pyddine, pyridazine, pyrimidine, pyrazine or triazine.

8. A perylene-3,4:9,10-tetracarboxylic imide according to claims 1, in which
A is a radical of the formula

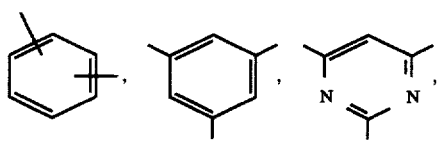

-continued

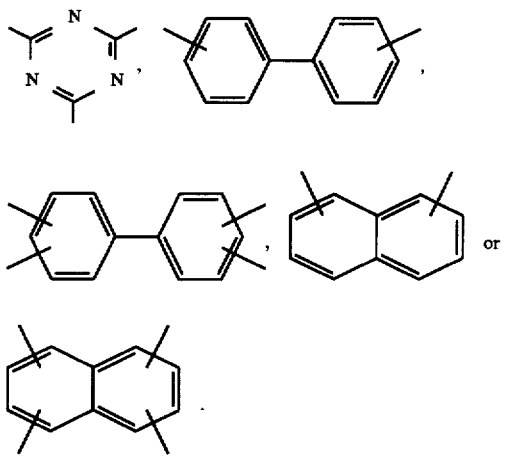

or

* * * * *